United States Patent Office 3,256,219
Patented June 14, 1966

3,256,219
PROCESS FOR THE PRODUCTION OF POROUS PLASTICS AND PRODUCTS COMPRISING POLYMERIZING A MONOMER IN A WATER-IN-OIL EMULSION
Guenther Will, Zimmerstrasse 11, Darmstadt, Germany
No Drawing. Filed Aug. 13, 1963, Ser. No. 301,920
Claims priority, application Germany, July 28, 1959, W 26,093
26 Claims. (Cl. 260—2.5)

The present application is a continuation-in-part of application Serial No. 45,786, filed July 28, 1960, and entitled, "Production of Cellular Materials From Vinyl-Type Resins," now abandoned.

This invention relates to a process for the production of porous plastics and the products produced thereby.

Several methods have been disclosed for the manufacture of porous plastic materials of sponge or foam-like structure. One known method, which is analogous to that used in powder metallurgy sintering, is merely to compact a powdered or granular polymer at a temperature slightly below its melting point. In this way the particles are not fused intimately together but hollow spaces are left in the interstices of the mass.

According to another method, the powdered polymer is mixed with a granular soluble salt, for instance, a water-soluble salt and is heated until it is softened or molten to a compact mass. The soluble salt is then leached from the mass by a solvent, for instance, by water. The remaining product is porous. Its density is dependent on the amount of soluble salt mixed with the polymer prior to heating the same.

It is also known to produce porous plastics by polymerizing a polymerizable compound and subjecting it either during or after its polymerization to the action of gases or of gas-producing compounds. This method suffers, among others, from the drawback that it can be applied but to a relatively small number of plastics, and that it does not allow one to regulate in a simple way the volume ratio of solid substance to pores, as well as the diameter of the individual pores.

It is the object of the present invention to provide a process for the production of porous plastics which process is an improvement over said prior art process.

Another object of the present invention consists in providing a substantially stable composition containing a polymerizable monomer which composition, on subsequent polymerization, yields a porous plastic of improved properties.

A further object of the present invention consists in providing a porous polymer composition the pores of which are filled with a liquid material.

Still another object of the present invention is to provide an improved porous plastic of high strength properties.

Other objects of the present invention and advantageous features thereof will become apparent as the description proceeds.

In principle the objects of the present invention are achieved by providing a stable water-in-oil emulsion of the following composition:

(1) Water or an aqueous solution containing at least about 40% water forming the dispersed phase; and (2) A polymerizable organic liquid or a liquid the substantial portions of which consist of a polymerizable organic liquid which contains the following components:

(a) A polymerizable organic liquid consisting of a polymerizable organic compound having a low molecular weight or of several organic compounds of a low molecular weight which are copolymerizable with each other, said liquid being designated as constituent (a); and (b) At least one organic compound of low molecular weight which is not copolymerizable with the constituent (a) and/or at least one organic compound of high molecular weight which is not copolymerizable with the constituent (a) and/or at least one organic compound of high molecular weight which is copolymerizable with the constituent (a), said organic compound being soluble and contained in solution in the constituent (a) from which solution it is at least partly separated and precipitated, at least at the phase boundary by the dispersed phase (1), whereby it acts as an emulsifier, said compound being designated as constituent (b).

(c) If required, at least one organic compound of low molecular weight which is not copolymerizable with the constituent (a) and/or at least one organic compound of high molecular weight which is not copolymerizable with the constituent (a) and/or at least one organic compound of high molecular weight which is copolymerizable with the constituent (a) and which is soluble and contained in solution in the constituent (a), from which solution it is not separated and precipitated at the phase boundary by the dispersed phase (1), may be added. This compound, or compounds, is designated as constituent (c), all of said compounds (a), (b), and (c) forming the continuous phase. The thus composed emulsion is then polymerized in the presence of the usual polymerization initiators and activators to the porous polymer composition the pores of which, depending on the polymerization conditions, may still contain the aqueous liquid initially forming the dispersed phase (1) which is finally completely or partly eliminated from the thus obtained porous plastics.

In the porous plastics obtained in the afore-mentioned way, the pores are produced by the dispersed phase (1) and the structure of the plastic is produced by the continuous phase (2).

The fundamental discovery of the present invention is that it is possible to form water-in-oil emulsions in which the aqueous phase remains in its dispersed state even during and after the monomer is polymerized. These emulsions can be prepared by making use of microgels acting as the emulsifiers.

These microgels are believed to be peculiar to polymeric systems. When a polymer is dissolved in a solvent, and a non-solvent for said polymer is introduced into said solution, a turbid phase appears to precipitate out of solution. This turbid phase consists of finely divided droplets containing polymer, solvent, and non-solvent, and on further examination these droplets generally prove to be gelatinous. This formation of microgels is fundamentally different from a system which does not contain polymers. For instance, when sugar is in aqueous solution and a non-solvent for sugar is added, the sugar is precipitated in pure form, there being no turbid phase containing sugar, solvent, and non-solvent. For a more detailed explanation of the theory underlying the formation of microgels, reference is made to the textbook, "Principles of Polymer Chemistry" by P. J. Flory, Cornell University Press, Ithaca, New York, 1953, Chapters VIII–3 and XIII.

In the present invention the relationship between the solvent, non-solvent, and polymer or component (b) are extremely important. By varying these relationships, it is possible to produce either sponge-like materials having intercommunicating pores or, on the other hand, foam-like material having isolated non-intercommunicating pores. Before proceeding with a discussion of these different possibilities, attention is directed to the following definitions of solvent, non-solvent, and polymer, as used in the present invention.

A solvent, or component (a) as defined hereinabove, is a liquid in which the polymer, or component (b) as defined hereinabove, is soluble at least to the extent of about 0.5 part, by weight, of the polymer in 100 parts, by weight, of solvent, preferably 2 parts of polymer in 100 parts of solvent.

A non-solvent, or dispersed phase (1) as defined hereinabove, is a liquid in which the polymer has a solubility of less than about 10.0 parts, by weight, of polymer, preferably less than 1.0 part in 100 parts of non-solvent. Furthermore, the non-solvent should be soluble in the solvent in a range of about 0.001 part to 20 parts of non-solvent, preferably about 0.005–0.1 part to 100 parts of solvent. (All of the solubilities as described above are those determined at room temperature or, if the monomer is a solid at room temperature, at 100° C.)

According to the process of the present invention porous plastics can be produced in which the volume ratio of solid matter to pores is approximately from 1:0.25 to 1:20 and in which the individual pores have a diameter approximately from $0.1\mu$ to $600\mu$. The volume ratio of solid matter to pores can be regulated in a simple manner by a corresponding selection of the ratio between the compounds forming the continuous phase (2) and the liquid forming the dispersed phase (1), while the diameter of the individual pores can be determined by producing a finer or coarser dispersion of the dispersed phase (1) in the continuous phase (2).

The process according to the present invention for the production of porous plastics must not be confused with the conventional emulsion polymerization processes.

The latter processes are characterized in that an oil-in-water emulsion containing ($\alpha$) water or an aqueous solution as the continuous phase (2),
($\beta$) a polymerizable organic liquid or a liquid consisting substantially of a polymerizable organic liquid as the dispersed phase (1), and
($\gamma$) an emulsifier or a mixture of emulsifiers, respectively, and/or a protective colloid or a mixture of protective colloids, respectively, is polymerized in the presence of polymerization initiators, and, if desired, in the presence of polymerization activators.

In said processes the plastic is obtained in the form of small, noncohesive, compact beads.

The emulsifiers which were used heretofore were soluble in at least one or both of the liquid phases and due to their chemical properties are able to reduce the interfacial surface tension between the water and oil phases. Although some of these emulsifiers can be satisfactorily utilized to form an emulsion of water-in-vinyl-type monomers, it is well known that such emulsions will break on polymerization of the monomer. In other words, prior to the present invention, it was found that the dispersed water phase in a water-in-vinyl-type monomer will coalesce before a solid polymerized structure is formed.

The water-in-oil-emulsions, which are useful in carrying out the process according to the present invention contain, as mentioned under (1), water or substantially water as agent forming the dispersed phase (1).

In general, the dispersed phase (1) is to contain not less than 25%, by weight, and preferably not less than 70%, by weight, of water.

In case the dispersed phase (1) does not exclusively consist of water, it contains, besides water, other additives, which are soluble in water. Examples of such added compounds are alcohols, in particular lower monohydric aliphatic alcohols like methanol, ethanol, n- and iso-propanol, and n-, iso- and tertiary butanol; furthermore lower organic acids like actic acid and propionic acid, moreover lower ethers and lowerketones like methyl ethyl ether and dimethylketone as well as inorganic salts like sodium chloride, potassium sulfate, sodium sulfate, magnesium sulfate, and magnesium chloride.

Organic liquids with a high dielectric constant like formamide and dimethylformamide, or saccharose, glucose, fructose, or other carbohydrates in aqueous solution may also be used as the dispersed phase (1).

As stated above, the water-in-oil emulsion forming the starting material for producing the porous plastic according to the present invention contains, as principal member of the continuous phase (2) described hereinabove, a polymerizable organic liquid or solvent designated hereinabove as component (a) which is a polymerizable organic liquid consisting of a polymerizable organic compound of low molecular weight or of several organic compounds of low molecular weight that are copolymerizable with each other. The continuous phase should in general contain not less than 10%, by weight, and preferably not less than 45%, by weight, of said constituent (a). It is also possible to use a solution of one or several non-liquid, copolymerizable organic compounds of low molecular weight in one or several liquid copolymerizable organic compounds of low molecular weight. Compounds containing at least one group of the formula

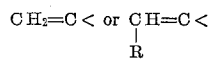

and/or

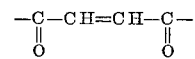

are particularly suitable as liquid polymerizable compounds of low molecular weight. Examples thereof are compounds which contain, attached to an aromatic nucleus, vinyl or $\alpha$-alkyl vinyl groups such as styrene, divinyl benzene, o-, m-, p- and $\alpha$-methyl styrene, furthermore, esters and ethers of vinyl alcohol such as vinyl acetate, divinyl phthalate, divinyl maleate, vinyl butyl ether, divinyl ethanediol ether; additionally, acrylic and methacrylic acid esters such as ethyl acrylate, 1,2-propanediol diacrylate, methyl methacrylate, ethanediol dimethacrylate, butene-2-diol-1,4-dimethacrylate, maleic acid diethyl ester; furthermore unsaturated hydrocarbon halides and cyanides such as vinylidene chloride, allyl chloride, chloroprene acrylonitriles, furthermore unsaturated aliphatic hydrocarbons such as isoprene; as well as the esters and ethers of allyl and methallyl alcohols such as diallyl phthalate, methallyl methyl fumarate, 1,2,3-tri(allyloxy) propane, di-allyl diglycol carbonate, di-allylmalleate.

Suitable for being used as non-liquid polymerizable monomers of low molecular weight are gaseous and solid compounds, for instance, butadiene, vinylchloride, vinyl naphthalene, vinyl carbazole.

The other essential constituent of the continuous phase (2) is the compound (b) which is, as stated above, at least one organic compound of low molecular weight that is not copolymerizable with the constituent (a) and/or at least one organic compound of high molecular weight which is or, respectively, is not copolymerizable with the constituent (a), whereby said constituent (b) must be soluble in the constituent (a) and must, at least partly, be separated and precipitated from said solution at the phase boundary by the constituent of the dispersed phase (1), whereby it acts as an emulsifier.

To find out whether a polymer can be used as constituent (b), the following simple small-scale test is carried out in the following manner. Either the prospective constituent (b), i.e., the polymer is added to water or the specific aqueous solution of the dispersed phase (1), i.e., the non-solvent whereafter the constituent (a), i.e., the polymerizable monomeric solvent is admixed. Or the prospective constituent (b), i.e., the polymer is first dissolved in the constituent (a), i.e., the polymerizable monomeric solvent, whereafter water or the specific aqueous solution of the dispersed phase (1), i.e., the non-solvent is added. For instance, 1% to 2%, by weight, of the constituent (b) are dissolved in constituent (a) and a few drops of water or of the specific aqueous solution, are added to 10 cc. of said solution of constituent (b) to be tested in constituent (a). The mixture is shaken thoroughly and centrifuged at 2000 revolutions to 3000 revolutions per minute until phase separation takes place. Any compound is suitable for use of constituent (b) in combination with constituent (a) and the aqueous solution (1) which produces in this test a turbid mixture or separation into separate phases. As a rule the more stable water-in-oil emulsions are obtained, the more pronounced is the separation or precipitation of the constituent (b) by the aqueous phase (1).

Suitable compounds (b) are in particular those which contain a major portion of hydrophobic groups and only a minor portion of hydrophilic groups. Such compounds are especially adapted to form the above mentioned microgel. The particular type of microgel which is formed on addition of water or the above mentioned aqueous solution, i.e., the non-solvent (1) to the solution of solvent constituent (a) and polymer constituent (b) is not especially affected by the amount of non-solvent (1). Larger amounts of non-solvent (1) merely result in larger amounts of water-in-oil emulsion. However, the polymerization is very considerably affected by the type of constituent (b) employed.

Suitable representatives of low molecular weight constituents (b) which are not copolymerizable with constituent (a) but are soluble therein and are precipitated from their solutions in constituent (a) by the addition of the aqueous solution (1) are emulsifiers as they are ordinarily employed for preparing water-in-oil emulsions, for instance, esters of higher fatty acids with relatively low molecular polyhydric aliphatic alcohols, esters of higher fatty alcohols with lower and higher fatty acids, amides of higher fatty acids as well as salts of higher alkyl sulfonic acids.

However, the preferred and particularly suitable compounds for use as constituent (b) are polymerization products and polycondensation products which are not at all or only slightly soluble in water and which contain, as hydrophilic groups, carboxyl groups, carboxylate groups, carboxamide groups, hydroxyl groups, ester groups, ether groups, amino groups, ammonium groups, sulfonic acid groups, sulfonate groups, and/or sulfoxide groups.

Such non-copolymerizable compounds of high molecular weight are, for instance, copolymerization products having an acid number of about 8 to 12, of polymerizable carboxylic acids, such as acrylic acid, and hydrophobic polymerizable organic compounds, such as styrene, as well as copolymerization products of said type in which the craboxyl groups are partly or completely neutralized with organic or inorganic bases or are converted into carboxamide group by means of ammonia or amines. Polymerization products and copolymerization products of styrene, of methyl methacrylate, and of vinyl acetate which are prepared by emulsion polymerization in the presence of persulfates and which, therefore, contain sulfonic acid or sulfonate groups, respectively. Furthermore, for instance, saturated polymerization products and saturated polycondensation products which contain as hydrophilic groups, exclusively or practically exclusively ester and/or ether groups like polymethyl methacrylate and cellulose ether acetobutyrate may also be used.

Particularly suitable interpolymerizable compounds of high molecular weight are, for instance, polycondensation products of the unsaturated polyester type containing carboxyl groups and/or hydroxyl groups and/or ether groups. Such unsaturated polyesters are composed of polyesters of polybasic, in particular dibasic, carboxylic acids and of polyhydric, in particular dihydric, alcohols. These unsaturated polyesters may also contain the radicals of monovalent carboxylic acids and/or the radicals of monovalent alcohols and/or the radicals of hydroxy carboxylic acids provided such unsaturated polyesters contain polymerizable ethylenically usaturated groups. Such polyesters are described, for instance, in the book on "Polyesters and Their Applications" by J. Bjorksten, H. Tovey, B. Harker and J. Henning, Reinhold Publishing Corporation, New York.

The polyesters can be prepared, for instance, from their components by a fusion-type condensation or a condensation under azeotropic conditions. Dihydric alcohols, for instance, ethanediol, 1,2-propanediol, 1,3-propanediol, diethylene glycol and 1-allyl-2,3-hydroxypropanediol, in approximately stoichiometric quantities can be converted with $\alpha$-ethylenically unsaturated dicarboxylic acids such as maleic and fumaric acid, into polyesters suitable as constituent (b). Other unsaturated or saturated dicarboxylic acids, like endomethylene tetrahydrophthalic acid, tetrahydrophthalic acid, o-, m- and p-phthalic acid, succinic acid, and adipic acid, may also be employed as condensation components of the unsaturated polyesters. Furthermore, mono-, tri-, or polybasic carboxylic acids, such as propionic acid, 1,2,4-benzene tricarboxylic acid, and 1,2,4,5-benzene tetracarboxylic acid and mono-, tri-, or polyhydric alcohols, such as benzyl alcohol, 1,2-di-(allyloxy)-3-propanol, glycerol, and pentaerythritol as well as hydroxy carboxylic acids, such as 4-hydroxy methyl cyclohexane carboxylic acid can be used as additional components of the unsaturated polyesters.

Particularly stable emulsions are obtained with unsaturated polyesters in which the residual carboxylic groups are partly or completely neutralized with compounds having a basic reaction. Suitable compounds of basic reaction are, for instance, sodium hydroxide, potassium hydroxide, magnesium hydroxide, calcium hydroxide, ammonia, amines such as ethylamine, tri-($\beta$-hydroxy ethyl) amine, and $\alpha$-methyl-$\beta$-hydroxy ethylamine, furthermore water-soluble precondensation products of aminoplasts, such as precondensation products of formaldehyde and melamine, formaldehyde and urea, of formaldehyde and dicyandiamide.

There may also be mentioned as copolymerizable compounds of high molecular weight polymerization products containing hydrophilic groups and, in addition, groups which can be further polymerized. Examples of such polymerization products are prepolymerization products from compounds containing hydrophilic groups as well as at least two polymerizable vinylidene groups, such as diallyl phthalate and ethylene glycol dimethacrylate, furthermore precopolymerization products from compounds containing hydrophilic groups as well as at least two polymerizable vinylidene groups and compounds containing one polymerizable vinylidene group such as precopolymerization products from diallyl phthalate and allyl acetate or from ethylene glycol dimethacrylate and methyl methacrylate.

The efficiency of the component (b) as an emulsifier is often increased by adding water-soluble organic compounds of low molecular weight containing a hydrophilic as well as a hydrophobic group additionally to the water forming the dispersed phase (1) of the water-in-oil emulsion. Compounds which are suitable for this purpose are, in particular, alcohols, organic acids, ethers, and ketones as they are mentioned hereinabove as agents forming the dispersed phase (1). It is possible to readily find by means of the above-mentioned small-scale test which agent forming the dispersed phase (1) is particularly suitable for being employed together with given agent (a) and (b) forming the continuous phase (2).

Suitable polymer constituents (b) of the continuous phase (2) have a minimum molecular weight of about 1,000. The preferred molecular weight range is between 20,000 and 200,000.

It has been found that the pH-value of the solvent-polymer-non-solvent system is also of importance. For instance, to form a structure having non-intercommunicating pores, it is necessary that the pH of the non-solvent aqueous solutions be higher than 5.0. An example of this system is: Polymethacrylate as the polymer, styrene as the solvent monomer, and a mixture of ethanol and water as the non-solvent. The microgel which consists of polymethacrylate, styrene, ethanol, and water has an affinity for the ethanol-water non-solvent mixture. This is due to the high concentration of polymethacrylate in the microgel and because said polymer contains ester linkages which are comparatively polar, thereby attracting the polar non-solvent. Similar systems are formed when the non-solvent contains water-soluble vinyl monomers such as acrylic acid, vinyl alcohol and acrylonitrile. These latter systems work especially well in the presence of water-soluble polymerization initiators.

In contrast to porous structures containing non-intercommunicating cells, it is also possible to obtain what may be called a coherent system containing contiguous intercommunicating pores. This structure is obtained when the microgel has a poor affinity for the non-solvent. For instance, when polystyrene prepared by emulsion polymerization is dissolved in methyl methacrylate, it is precipitated by small amounts of water. The microgel in this case contains a high proportion of polystyrene and therefore, it has a rather low affinity for the non-solvent water. When this system is polymerized with the aid of heat and a soluble peroxide, the water-in-ester emulsion undergoes a phase change at a certain stage of polymerization, thereby resulting in an a solid polymerization product having a three-dimensional framework, similar to a sponge, containing the non-solvent water throughout.

In these systems wherein water is utilized as the non-solvent, the formation of a coherent mass is favored by pH values lower than 5.

Due to the complexities of the relationship between microgel and non-solvent, it is rather difficult to predict in many cases whether the pores of the polymerization product will be communicating or non-communicating. In general, both types of pores are produced in the polymerization products obtained from water-in-oil emulsions according to the present invention, since a wide range of polarities can be imparted to all the materials used, i.e., the solvent or constituent (a), the polymer or constituent (b), and non-solvent or agent forming the dispersed phase (1). In general, a foam-like, predominantly non-intercommunicating cell structure is obtained by taking care that the interfacial surface tension between the polymer solution in the solvent monomer and the non-solvent is higher than the interfacial surface tension between the solvent monomer and the non-solvent alone. Likewise, if a predominantly coherent plastic is desired, the interfacial surface tension between the polymer solution in the solvent monomer and the non-solvent is preferably lower than the interfacial tension between the solvent monomer and the non-solvent alone.

As stated hereinabove, there may be added, if required, to the monomer constituent (a) and the emulsifying polymer constituent (b) a further constituent (c) which may be an organic compound of low molecular weight that is not copolymerizable with the constituent (a) and/or an organic compound of high molecular weight that is not copolymerizable with the constituent (a) and/or an organic compound of high molecular weight that is copolymerizable with the constituent (a) provided said compounds are soluble in constituent (a) and are not separated or precipitated from said solution at the phase boundary by the agent forming the inner phase (1).

Suitable compounds of low molecular weight of the above mentioned type are, for instance, esters of lower alcohols with lower carboxylic acids or dicarboxylic acids, such as dibutyl phthalate and dimethyl adipate. These compounds can serve as plasticizers for the final porous plastics.

Suitable non-copolymerizable compounds of high molecular weight as mentioned above are in particular homopolymers and copolymers which are free of hydrophilic groups as, for instance, bulk or precipitation polymers of styrene or vinylchloride, which have been prepared by using organic peroxides as polymerization initiators. Such polymers not only affect the properties of the final plastic such as its elasticity, hardness, and inflammability, but also the stability and other properties of the emulsion during its polymerization.

Other suitable copolymerizable substances of high molecular weight useful as constituents (c) are in particular homopolymers and copolymers which are free of hydrophilic groups but still contain vinylidene groups. Examples of such substances are copolymerization products of styrene and butadiene. Such compounds are advantageously used to produce final products with particularly good electrical properties. The water-in-oil emulsions to be used in the process according to the present invention are preferably prepared in the following manner: The constituents (a), (b), and, if required, (c) forming the continuous phase (2) are mixed to form a solution, whereupon the aqueous agent forming the dispersed phase (1) is slowly added to said solution while stirring and/or shaking so as to form an emulsion. Thereby, care must be taken that the resulting water-in-oil emulsion is not converted into an oil-in-water emulsion. In some cases it may be necessary to prepare the water-in-oil emulsion in another sequence of steps from its constituents. Thus it is possible first to mix the constituent (a) or the solvent of the continuous phase (2) with the aqueous agent or the non-solvent forming the dispersed phase (1) and thereafter to add the constituent (b) or the polymer or, if required, the constituents (b) and (c) of the continuous phase (2). Usually the emulsions according to the present invention are prepared under atmospheric pressure and at room temperature. However, if desired, it is also possible to operate at higher or lower pressure and/or at higher or lower temperature.

The water-in-oil emulsions according to the present invention contain the constituents forming the continuous phase (2) and the aqueous agent forming the dispersed phase (1) at a volume ratio of from about 1:0.25 to about 1:20, preferably at a volume ratio of from 1:1 to 1:10. The weight ratio of the constituent (a) or solvent of the continuous phase (2) to the constituent (b) or the polymer of the continuous phase (2) is in general between about 1:0.0002 and about 1:0.2, preferably between 1:0.001 and 1:0.1. However, it may also be increased up to 1:4 if the constituent (b) is an organic substance of a high molecular weight. The weight ratio of the constituent (a) of the continuous phase (2) to the constituent (c) of the continuous phase (2) may range from 1:0 to 1:3.8 provided the weight ratio of the constituent (a) to the sum of the constituents (b) and (c) does not become smaller than 1:4.

In order to prepare porous plastics according to the present invention the resulting water-in-oil emulsions are polymerized. Polymerization may be initiated by admixing water-soluble as well as oil-soluble initiators, or initiators and activators, respectively, preferably at temperatures between about 0° C. and about 100° C. If initiators and activators are jointly used, it may be of advantage that one of these compounds be water-soluble, whereas the other one be soluble in oil. Suitable water-soluble initiators or activators, respectively, are those which are usually employed in emulsion polymerization such as alkali formaldehyde sulfoxylate, persulfates and hydrogen peroxide or, respectively, sodium hydrogen sulfite and cobalt chloride. Suitable oil-soluble initiators or activators, respectively, are also the conventional ones, such as benzoylperoxide, lauroyl peroxide, ethyl methyl ketone peroxide, cyclohexanone peroxide, and azo di-isobutyric acid nitrile, or, respectively, N,N-di-isopropyl-p-toluidine or other tertiary amines and cobalt naphthenate. The initiators and activators are employed in quantities of from 0.1% to 10%, by weight, or, respectively, from 0.01% to 5%, by weight, preferably from 0.5% to 4%, by weight, or, respectively, 0.1% to 4%, by weight, calculated for the total weight of the emulsion. It may be of advantage for increasing the "pot life" of the emulsion by dividing the same in two portions and adding the initiator to the one of said portions and the activator to the other one. Shortly before use the two portions are combined to yield the porous plastic.

The emulsions to which initiators or, respectively, initiators and activators have been added polymerize and harden depending upon their composition, the type and quantity of initiator or, respectively, of initiator and activator added, and the polymerization temperature, within a period of time ranging from a few minutes to several hours and yield porous plastics, the pores of which are filled with water, i.e., the aqueous dispersed phase (1). The water diffuses in the course of time from the resulting porous structures or it is eliminated therefrom by a heat and/or pressure treatment. Although it could be expected that, on polymerization of the above-described water-in-oil emulsion, polymerization products are obtained which contain the aqueous medium or non-solvent forming the dispersed phase (1) in the plastic structure in the form of fine droplets that are not interconnected with each other, the resulting porous plastics have also numerous pores which are interconnected with each other and are open at the surface of the plastic. This phenomenon is probably due to the fact that the water-in-oil emulsion becomes somewhat unstable during the course of the polymerization, so that the individual droplets of the dispersed phase cohere. This is in agreement with the fact that relatively unstable water-in-oil emulsions or emulsions which have been rendered unstable by the admixture of certain additives such as compounds of acid reaction or compounds forming compounds of acid reaction, respectively, for instance, ammonium chloride, sulfuryl chloride, and p-toluene sulfonyl chloride yield in the course of their polymerization, polymerization products with a pronounced coherence between the individual droplets of the aqueous agent forming the dispersed phase (1).

As has been found, the amount of water added is of considerable importance in the production of a finely porous body on block polymerization of a water-in-oil emulsion according to the present invention. The amount of water required in order to produce a well-drying product can readily be determined by simple preliminary tests. In general said amount should not be less than 25%, by volume, of the total water-in-oil emulsion. Preferably amounts of water ranging from 45% to 95% and more advantageously from 60% to 90%, by volume, calculated for the water-in-oil emulsion are used for carrying out the process according to the present invention.

Drying of the resulting porous polymerized body is considerably improved by employing, as emulsifiers, polymers of high molecular weight which are insoluble or hardly soluble in water, as this has been mentioned hereinabove in connection with the constituent (b). Such polymers are used in amounts between 0.1% and 2.5% of the polymerizable portion of the mixture.

The preparation of stable water-in-oil emulsions containing such large amounts of water results in the water being dispersed in the form of spherical droplets having a diameter between less than 1μ to approximately 50μ. The spherical shape of the droplets yields cells of highly spherical form which impart to the final porous body an extremely high resistance to compression and which show when compared with foams of the same density obtained by blowing with gases or vapors, a compressive strength that is increased by more than 200%.

According to another embodiment of the present invention compounds capable of generating gases under the polymerization and/or drying conditions, for instance, at increased temperature or decreased pressure may be added to the aqueous phase (1) or the continuous phase (2). Such gas generation may be caused by decomposition of said compound or by the transition of said compound from the dissolved or liquid state into the gaseous state. For instance, the aqueous phase (1) may contain compounds which readily split off carbon dioxide, or relatively readily volatile, water-soluble lipophobic compounds such as carbon dioxide. The constituents of the continuous phase (2) may contain, as blowing agent, relatively readily volatile, hydrophobic substances, for instance, halogenated hydrocarbons, such as 1,1-dichloro-2,2-difluoro ethane. The blowing agent can be added to the emulsion in a conventional manner in the course of its preparation. The amount of blowing agent should not exceed about 20%, by weight, and should preferably be about 10%, by weight, of the total emulsion.

The water-in-oil emulsions as they are employed in the process according to the present invention may contain conventional additives as they are employed in the plastic art, for instance, plasticizers, dyes and pigments, organic and inorganic fillers, agents rendering the plastic thixotropic, fireproofing agents as well as inorganic or organic fibers, fabrics and woven textile materials. The process and products according to the invention can be applied for many products because, on the one hand, most of the known polymerizable monomeric organic compounds can be converted into plastics of known chemical composition and because, on the other hand, the properties of the porous plastics, due to the starting monomers and polymers used, are essentially the same as those of the corresponding non-porous plastics. Therefore, it is possible for a person skilled in the art to predict approximately which properties the individual porous plastics of known chemical composition will have. Hence, it is not difficult for a person skilled in the art to select suitable starting materials for the production of porous plastics of predetermined properties.

In order to produce porous plastic articles according to the process of the present invention, the water-in-oil emulsion can be applied in the required thickness, for instance, to workpieces, materials, and tools of various types made from wood, metal, plastic, rubber, concrete, brickwork, or the like. Coatings may be produced therefrom or sheets, plates, webs or foils, if care is taken, for instance, by employing a mold release compound so that the coating does not firmly adhere to the mold material. The coatings and plates and the like bodies are heat insulating and soundproof and, therefore, of particular importance, for instance, in the building art as flooring, wall and ceiling covering or facing or as supporting building material of light weight. The sheets and foils are useful, for instance, as "breathing" artificial leather, i.e., leather permeable to air or as "breathing" packing material, i.e., packing material which is permeable to air, in particular, if fibers, fabrics or woven textile material or organic materials are employed in the production of such articles. The properties of the resulting artificial leather can be adjusted to those of natural leather by adding hydrophilic fillers thereto. Products obtained according to the process of the present invention are also useful as cork substitute.

Furthermore, it is possible to use the water-in-oil emulsions according to the present invention as adhesives or to produce laminated bodies therefrom in which layers, for instance, from the above-mentioned materials, alternate with layers of porous plastic made from water-in-oil emulsions. Shaped bodies of almost any shape, for instance, flat and corrugated plates, sheets, buttons, structural sections, door frames, pipes, casings, containers, shoe lasts can also be manufactured from such water-in-oil emulsions according to techniques known per se in the manufacture of synthetic resins. Thereby, it is often advantageous to admix fibers and/or organic or inorganic, if desired, expanded filler materials such as mica, lava, pumice, and perlite. Thus, there can be obtained, depending upon the proportion of fibrous materials to emulsion, fibrous articles impregnated with plastics or articles reinforced with fibers, for instance, glass fibers. If filler materials are employed, their amounts added may be not only quite small, but also so large that they are the predominant component of the finished shaped article, for instance, light building plates and that therein the plastic component of the emulsion acts only as binding agent. Finely, porous filters for gases and liquids as well as separators for storage batteries may also be produced by the process according to the present invention. The electrical resistance to the present invention. The inner electrical resistance of such separators is particularly low, if they are manufactured from emulsions containing inorganic salts dissolved in the aqueous agent forming the dispersed phase (1).

In place of fibrous materials such as glass fibers or, respectively, in addition thereto, there may be embedded in the emulsion according to the present invention reinforcing elements such as metal screens, perforated rubber and plastic plates or sheets, and others.

The emulsions according to the present invention may be polymerized in suitable molds, for instance, by casting. In order to increase the rate of production of such cast articles, a solid polymer either in the form of a powder or in the form of a highly viscous solution, may be obtained prior to the polymerization of the emulsion, thereby increasing the rate of polymerization. Such polymer powders or solutions can be added prior to or subsequent to the emulsifying step. Preferred polymers are the polymerization products of the used monomers, for instance, polymethacrylate when using methacrylate as constituent (a), polystyrene when using styrene as constituent (a), etc.

Thus, an emulsion according to the present invention which will polymerize very rapidly includes a solution of an activator such as a tertiary amine, an emulsifying polymer in a polymerizable monomer, a non-solvent which emulsifies with the latter two ingredients, and a solid polymer mixed with a suitable amount of an initiator such as lauroyl peroxide. Products made from a composition such as the one just mentioned will harden in a relatively short time when heated to a sufficiently high temperature. Furthermore, upon hardening, the mass will be readily separable from the mold due to the fact that water will act as a lubricant and mold release agent on the surface of the cast mass.

When producing cellular plastic with predominantly non-intercommunicating cells, it is possible to produce structural building materials wherein the cells are filled with dyestuffs or with agents protecting against ionizing radiation, and the like. To prevent subsequent escaping and diffusion of the cell contents from the cellular plastic material, it may be provided with a protective coating sealing the cells.

Removal of the aqueous dispersed phase (1) after polymerization from the resulting porous plastic is achieved, for instance, by drying at elevated temperature, in a vacuum, by compressing the plastic, or by allowing it to stand in an air current whereby the water evaporates.

The resulting plastic articles may be rendered substantially fireproof by adding fireproofing agents such as chlorinated paraffins or water soluble salts such as ammonium carbonate thereto.

The hardened plastic articles may be coated, for instance, sprayed with lacquers or coated with metal or the like foils applied thereto by an adhesive.

As stated above, the resulting plastic material can be used for many purposes, for instance, for manufacturing, advertising and packing material, toys and household goods, for interior decoration, shop windows, decoration for fair stalls, lamps, furniture, signboards or billboards, orthopedic devices, material for splinting bone fractures and others.

The following examples serve to illustrate the present invention without, however, limiting the same thereto.

*Example 1*

Two parts, by volume, of styrene containing 2% lauroyl peroxide as polymerization initiator, about 3% of polystyrene of a low intrinsic viscosity, and 0.3% of polymethacrylate are emulsified by stirring with one part, by volume, of a mixture of 20% of ethanol and 80% of water containing 0.01% of acetic acid.

The resulting viscous water-in-oil emulsion is poured in a mold wherein it is polymerized and hardened at a temperature of about 50° C. A solid porous mass, the pores of which are filled with water-ethanol is obtained. The liquid is subsequently evaporated from the pores by standing in air.

*Example 2*

One part, by volume, of methyl methacrylate containing 0.2% of polystyrene and 2.5% of methyl polymethacrylate is stirred with two parts of an aqueous solution of 0.55% of potassium persulfate, 0.1% of sodium sulfite, and 0.2% of acrylic acid which is adjusted to a pH between 8.0 and 9.0 by the addition of ammonia. The resulting water-in-oil emulsion is heated to a temperature between 70° C. and 80° C. for about half an hour and poured on a plate or in a mold which is also maintained at a temperature between 70° C. and 80° C. After half an hour to two hours, polymerization and hardening is completed and an opaque plastic sheet or molded article is obtained which contains water in finely dispersed mostly non-intercommunicating droplets.

*Example 3*

One part, by volume, of styrene containing 3% of polyvinyl acetate, 5% of dioctyl phthalate, and 1.5% of cumene peroxide is vigorously shaken with one part of a mixture of ethanol and water (2:1, by volume) which contains 0.05% of disodium saccharate and 0.01% of ferrous sulfate $FeSO_4$ and has a pH of about 9.0. The resulting water-in-oil emulsion is then heated to a temperature of 60–70° C. while stirring. After the emulsion becomes thick and creamy, it is poured on a plate which is also held at a temperature of about 70° C. A plastic sheet is obtained containing mostly non-communicating droplets of the methanol-water mixture. It is blown up to a foam-like material by heating to a temperature above 130° C.

*Example 4*

One part, by volume, of a mixture containing 2 parts of acrylonitrile and 1 part of vinylidene chloride, which mixture contains 1% of polystyrene and 1.5% of polymethacrylate is emulsified by stirring with one part of water which contains 1.5% of hydrogen peroxide, 0.2% of glucose, 0.05% of ferrous sulfate, and 0.1% of sodium ethylene diamine tetra-acetate, said aqueous solution being of neutral reaction. After heating the mixture to 40° C. while stirring continuously for about ten minutes, the resulting water-in-oil emulsion is poured on a plate and set in a warm place. A milky plastic sheet is obtained, which can be transformed into a foam-like material by slowly heating the same at a temperature above 170° C. for some time. When the volume of the plastic sheet does not increase any more, the resulting copolymer is cooled rapidly to form a stable foam-like sheet.

*Example 5*

0.6 parts, by weight, of styrene containing, in solution 2% of lauroyl peroxide and 2% of polystyrene and one part, by weight, of a water-ethanol mixture (3:1) are filled in an autoclave provided with a stirring device. Gaseous butadiene is then introduced until 0.4 part, by weight, thereof are absorbed. This mixture is then heated to 35° C. until the pressure decreases to about atmospheric pressure. The autoclave is then opened, and the resulting water-in-oil emulsion is filled in warm molds. After about half an hour, polymerization and hardening is completed. The molds are opened and the resulting porous copolymers are dried in a warm air-stream.

Example 6

In 92.5 g. of methacrylic acid methyl ester as constituent (a) of the compounds of the continuous phase (2) there are dissolved 5 g. of polystyrene produced by emulsion polymerization in the presence of persulfate as constituent (b) of the components of the continuous phase (2) and 3.5 g. of a 50% benzoylperoxide paste. 1.7 g. of dimethyl-p-toluidine and 500 g. of water which forms the dispersed phase (1) are added to said solution while stirring vigorously. The resulting water-in-oil emulsion is stirred at a temperature of 50° C. until a homogeneous cast mass is formed which is poured into molds and polymerized at a temperature of 50° C. Porous plastic articles are obtained containing water in finely dispersed form. The water can be eliminated on heating at a temperature of 60° C.

Example 7

In 100 cc. of styrene as constituent (a) of the components of the continuous phase (2) there are dissolved 2 g. of polystyrene produced by emulsion polymerization in the presence of persulfate as constituent (b) of the components of the continuous phase (2), 5 cc. of a 60% solution of methyl isobutyl ketone peroxide and 0.3 cc. of a 10% solution of cobalt naphthenate. 60 cc. of said solution are added to 40 cc. of a mixture composed of 93 cc. of water and 7 cc. of isopropanol which mixture forms the dispersed phase (1). The mixture is stirred until a water-in-oil emulsion is formed. The emulsion is polymerized in a mold at a temperature between 70° C. and 90° C. A porous plastic article is obtained from which the components of the dispersed phase (1) can be eliminated by heating at a temperature between 60° C. and 70° C.

Example 8

100 cc. of methyl methacrylate as constituent (a) of the components of the continuous phase (2) are added to 1.6 g. of dimethyl-p-toluidine and then mixed with 100 g. of polymethyl methacrylate as constituent (b) of the components of the continuous phase (2) in which 2 g. of benzoylperoxide are finely dispersed. The mixture is stirred together with 200 cc. of a mixture of 89 cc. of water and 11 cc. of isopropanol which mixture forms the dispersed phase (1) until a water-in-oil emulsion is formed. The emulsion is then polymerized in a mold at a temperature between 40° C. and 50° C. for 10 minutes to 15 minutes. A porous shaped body is obtained from which the aqueous dispersed phase can be expelled by heating at a temperature of 50° C.

Example 9

In a mixture consisting of 80 g. of methyl methacrylate and 20 g. of ethylene glycol di-methacrylate as constituent (a) of the components forming the continuous phase (2) there are dissolved 1.8 g. of dimethyl-p-toluidine and 2.5 g. of a copolymerization product of 25% of vinyl acetate and 75% of methyl methacrylate produced by emulsion polymerization in the presence of persulfate as a first portion of the constituent (b) of the components forming the continuous phase (2). The solution is vigorously stirred for 15-20 minutes together with 80 g. of poly-methyl methacrylate as a second portion of said constituent (b) with the addition of 150 cc. of water as the component of the dispersed phase (1). After addition of 2 g. of benzoylperoxide dissolved in 15 cc. of ethyl methacrylate, the resulting water-in-oil emulsion is then applied to a glass fiber fleece which is impregnated therewith by enclosing it between two foils and pressing. Hardening is effected by heating at a temperature of 50° C. for 10 minutes to 15 minutes. A porous plastic plate reinforced by glass fibers is obtained thereby. The water contained therein is evaporated by heating at a temperature between 25° C. and 30° C. within about 24 hours.

Example 10

In a mixture consisting of 90 cc. of styrene and 10 cc. of acrylonitrile as constituent (a) of the components forming the continuous phase (2) there are dissolved 5 cc. of a 60% solution of methyl isobutyl ketone peroxide, 2 g. of polystyrene obtained by emulsion polymerization in the presence of persulfate as a first portion of the constituent (b) of the components forming the continuous phase (2) and 1 cc. of a 10% solution of cobalt naphthenate. 100 cc. of the resulting solution are mixed with 100 cc. of water as the component of the dispersed phase (1) while stirring, until a water-in-oil emulsion is formed. 100 g. of polymethyl methacrylate as a second portion of said constituent (b) are added to said emulsion. The mixture is poured into a mold and polymerized at a temperature between 60° C. and 70° C. A molded body of a porous polymerization product is obtained from which the pore-forming water is evaporated by heating at a temperature of 20-25° C. for several hours.

Example 11

To a mixture consisting of 65 g. of an unsaturated polyester of the acid number 40 prepared from maleic acid, phthalic acid, and propylene glycol at a molar ratio of 2:1:3.3 as constituent (b) of the components forming the continuous phase (2) and 35 g. of styrene as constituent (a) of the components forming the continuous phase (2) there are added 2 g. of benzoylperoxide and, thereafter, slowly 100 cc. of water as component forming the dispersed phase (1). The mixture is vigorously stirred at a temperature of 10° C. until a water-in-oil emulsion is formed. The emulsion is mixed with 0.18 g. of dimethyl-p-toluidine, poured on a glass plate to form a layer of the desired uniform thickness, for instance, between 1 mm. and 15 mm. and polymerized and hardened by heating at a temperature of 30° C. for 10 minutes. The water can be evaporated from the resulting porous plates by heating at a temperature between 80° C. and 100° C.

Example 12

65 g. of the unsaturated polyester described in Example 11 as a first portion of the constituent (b) of the components forming the continuous phase (2) as well as 1.5 g. of a copolymerization product of the acid number 10 prepared from styrene and acrylic acid as a second portion of said constituent (b) are dissolved in 65 g. of
 (a) A mixture of diallyl phthalate and styrene at a ratio of 1:3, by weight, or
 (b) In 65 g. of allylchloride, or
 (c) In 65 g. of vinylacetate.

The compounds mentioned under (a), (b), and (c) hereinabove are the constituents (a) of the components of the continuous phase (2).

To each of these solutions there are added 100 cc. of water as component of the dispersed phase (1) after the addition of 2 g. of benzoylperoxide. The mixtures are then emulsified by stirring vigorously. Each of the resulting emulsions is mixed with 0.18 g. of dimethyl-p-toluidine, poured on a glass plate to form layers of uniform thickness, and polymerized and hardened at temperatures of 60-70° C. Porous plastic sheets and plates are obtained thereby.

Example 13

A prepolymerization product of sirupy consistency as constituent (b) of the components forming the continuous phase (2) as it is obtained from 70 g. of methyl methacrylate, which still contains monomeric methyl methacrylate as constituent (a) of the components forming the continuous phase (2) is thoroughly mixed with 16.5 g. of ethylene glycol di-methylacrylate, 4.0 g. of a paste containing 50% of benzoylperoxide, and 10.0 g. of polyvinylchloride powder as constituent (c) of the components forming the continuous phase (2). The mixture is stirred with 100 g. of water as component forming the dispersed phase (1) until a water-in-oil emulsion is formed. The emulsion is allowed to stand for some time for the purpose of de-aeration, whereafter 1.5 g. of dimethyl-p-toluidine are added. It is spread in the desired thickness, for instance, of 5 mm. to 10 mm. onto a flat surface. The resulting coating is polymerized at a temperature of 60° C. for 10 minutes to 15 minutes. The water is allowed to evaporate by standing at a temperature of 20° C.

*Example 14*

To a mixture consisting of 65.0 g. of the unsaturated polyester described in Example 11 as constituent (b) of the components forming the continuous phase (2) and 35.0 g. of styrene as constituent (a) of the components forming the continuous phase (2) there are added 4.0 g. of a paste containing 50% of benzoylperoxide as well as 5.0 g. of polyvinylchloride powder as constituent (c) of the components forming the continuous phase (2). The resulting mixture is stirred together with 150 g. of water as component forming the dispersed phase (1) until a water-in-oil emulsion is formed. After its de-aeration it is mixed with 30.0 g. of styrene and 0.8 g. of dimethyl-p-toluidine, poured into molds, and polymerized and hardened at a temperature of 20° C. A porous shaped body is obtained from which the water is eliminated by heating to 100° C.

*Example 15*

A mixture is prepared from 35.0 g. of styrene, 25.0 g. of isoprene, both being the constituents (a) of the components forming the continuous phase (2), 60 g. of the unsaturated polyester described in Example 6 to which 2.0 g. of benzoyl peroxide and 3.0 of triethanolamine are added to cause salt formation, said polyester salt being the constituent (b) of the components forming the continuous phase (2). The mixture is stirred together with 0.5 g. of dimethyl-p-toluidine and 80.0 g. of water as component forming the dispersed phase (1) until a water-in-oil emulsion is formed. Said emulsion is poured into molds and is polymerized and hardened at 25° C. The water is eliminated from the resulting porous shaped article by heating at a temperature of 100° C.

*Example 16*

A mixture consisting of 75.0 g. of diallyl phthalate and 25.0 g. of methyl methacrylate, both being the constituent (a) of the components forming the continuous phase (2) is mixed with 2.0 g. of benzoylperoxide, 1.5 g. of dimethyl-p-toluidine, and 50.0 g. of prepolymerization product from diallyl phthalate as constituent (b) of the components forming the continuous phase (2). The mixture is stirred together with 75.0 g. of water as component forming the dispersed phase (1) until a water-in-oil emulsion is formed. The resulting emulsion is poured into molds at a temperature of 50° C. and is polymerized. Thereafter, the water is eliminated from the resulting porous shaped bodies by heating at 100° C.

*Example 17*

To 93.0 g. of methyl methacrylate as constituent (a) of the components forming the continuous phase (2) there are added 5.0 g. of polystyrene produced by emulsion polymerization in the presence of persulfate, said polystyrene begin the constituent (b) of the components forming the continuous phase (2), 2.0 g. of benzoyl peroxide, 1.5 g. of dimethyl-p-toluidine and 100.0 g. of a copolymerization product powder as filler as it is obtained from 40 parts of styrene and 60 parts of the unsaturated polyester described in Example 11. The mixture is stirred with 150 g. of water as component forming the dispersed phase (1), until a water-in-oil emulsion is formed. The emulsion is poured into molds and polymerized and hardened at a temperature of 50° C. The water is eliminated from the obtained porous shaped bodies by heating to 100° C.

*Example 18*

10 g. of benzoylperoxide are dissolved in 500 g. of an unsaturated polyester as described in Example 11 and 167 g. of styrene. 600 g. of water are slowly and gradually added to said solution at 5–10° C. while stirring until a white, creamy water-in-oil emulsion is formed. A solution of 0.8 g. of dimethyl-p-toluidine in 100 g. of styrene is stirred into said emulsion. The resulting fluid emulsion is cast into plate molds in a thickness of about 5 mm. The mold is exposed in a water bath to a temperature of 50° C. The cast resin polymerizes and hardens within about 10 minutes to 15 minutes. The water is removed from the porous plastic plates by heating to 100° C. The resulting plates have a density of 0.6.

*Example 19*

In place of styrene as used in Example 18, there is employed the same amount of methyl methacrylate while the other components, catalysts, emulsifying procedure, polymerization conditions, and removal of the water proceed in the same manner as described in said Example 18. A finely porous molded article of a density of 0.6 is obtained.

It may be mentioned that water-soluble protective colloids and surface-active agents must not be present in the emulsions because such protective colloids and surface-active agents would prevent formation of water-in-oil emulsions as they are required in accordance with the present invention.

The amount of non-solvent or component forming the dispersed phase, i.e., of water or an aqueous liquid, is chosen so that it corresponds to the desired total pore volume and thus permits exact adjustment of said pore volume. Although the resulting porous plastic bodies are of considerable porosity, they still show smooth or bright surfaces depending upon the mold walls.

The use of water as pore-forming component has considerable advantages. It prevents excessive overheating, even when the polymerization proceeds strongly exothermically, especially when using rapid activators. The polymerization heat can be dissipated more readily. Thus it is possible to produce molded bodies of large size without any excessive expansion of the polymerization product. The volume of the resulting plastic body varies only slightly with respect to the starting volume of the water-in-oil emulsion. Shrinkage is insignificant. The molded bodies are readily released from the molds or from surfaces on which they were cast due to the formation of a water film or of water vapors.

As stated above, the breathing activity of plates, sheets, coatings, foils made according to the present invention is excellent. The same is true with respect to their sound-absorbing and heat-insulating properties. The new plastics have very good elasticity properties and exhibit all the other working and processing advantages of plastics over other materials such as wood. Due to their fine porosity they can readily be drilled or nailed. They are especially valuable as leather substitute. The preferred leather substitute material is composed of the porous polymerization product of styrene or methyl methacrylate with an unsaturated polyester as constituent (b) of the continuous phase (2).

Of course, many changes and variations may be made in the composition of the various components of the water-in-oil emulsions, in their polymerization, the removal of the dispersed phase (1) therefrom and the like in accordance with the principles set forth herein and in the claims annexed hereto.

I claim:

1. A method of producing solid materials having a plurality of droplets dispersed therein, which method comprises forming a stable water-in-oil emulsion composed of water, methylmethacrylate, as the oil phase, and polystyrene having a molecular weight of at least 10,000 as the emulsifier, and polymerizing the methylmethacrylate to form polymethylmethacrylate without breaking the dispersed nature of the emulsion, thereby forming solid polymethylmethacrylate having a plurality of water droplets dispersed therein.

2. A method of producing solid materials having a plurality of droplets dispersed therein, which method comprises forming a stable water-in-oil emulsion composed of water, styrene, as the oil phase, and polystyrene, as the emulsifier; and polymerizing the styrene to form polystyrene without breaking the dispersed nature of the emulsion, thereby forming a solid plastic material having a plurality of water droplets dispersed therein.

3. A method of producing solid materials having a plurality of droplets dispersed therein, which method comprises forming a stable water-in-oil emulsion composed of water, a mixture of styrene and acrylonitrile, as the oil phase, and polystyrene, as the emulsifier; and polymerizing the mixture of styrene and acrylonitrile to form a copolymerization product there from without breaking the dispersed nature of the emulsion, thereby forming a solid plastic material having a plurality of water droplets dispersed therein.

4. A method of producing solid materials having a plurality of droplets dispersed therein, which method comprises forming a stable water-in-oil emulsion composed of water, styrene, as the oil phase, and an unsaturated polyester obtained from maleic acid, phthalic acid, and propylene glycol, as the emulsifier; and polymerizing the styrene to form polystyrene without breaking the dispersed nature of the emulsion, thereby forming a solid plastic material having a plurality of water droplets dispersed therein.

5. A method of producing solid materials having a plurality of droplets dispersed therein, which method comprises forming a stable water-in-oil emulsion composed of water, styrene, as the oil phase, an unsaturated polyester obtained from maleic acid, phthalic acid, and propylene glycol, as the emulsifier, and polyvinylchloride powder; and polymerizing the styrene to form polystyrene without breaking the dispersed nature of the emulsion, thereby forming a solid plastic material having a plurality of water droplets dispersed therein.

6. A method of producing solid materials having a plurality of droplets dispersed therein, which method comprises forming a stable water-in-oil emulsion composed of
(1) an aqueous medium selected from the group consisting of water and aqueous solutions of water-soluble alcohols, lower organic acids, lower alkanones, alkali metal salts, and magnesium salts, said aqueous medium forming the aqueous dispersed phase, said aqueous solution containing at least about 25%, by weight, of water,
(2) as dispersion medium, an organic liquid containing
(a) a polymerizable organic liquid selected from the group consisting of a polymerizable compound having at least one ethylenically unsaturated group, a polymerizable compound having at least one group of the formula

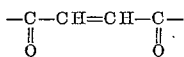

and copolymerizable mixtures thereof, said polymerizable organic liquid forming the oil phase; and
(b) a substantially water-insoluble polymeric compound being soluble in said polymerizable organic liquid, said compound being selected from the group consisting of substantially water-insoluble polymerization products, substantially water-insoluble polycondensation products, substantially water-insoluble unsaturated polyesters obtained from unsaturated polycarboxylic acids and polyhydric alcohols and mixtures thereof, said polymeric compounds containing hydrophilic groups in an amount insufficient to essentially increase their solubility in water, said polymeric compound forming the emulsifying agent on contact with said aqueous medium;
and polymerizing the polymerizable organic liquid in said water-in-oil emulsion to form the respective polymerization product without breaking the dispersed nature of the emulsion, thereby forming a solid plastic material having a plurality of water droplets dispersed therein.

7. A process for the production of porous plastics, which process comprises forming a stable water-in-oil emulsion containing
(1) an aqueous medium selected from the group consisting of water and an aqueous solution, said aqueous medium being the agent forming the dispersed phase, said aqueous solution containing at least about 25%, by weight, of water, and
(2) as dispersion medium, an organic liquid containing
(a) a polymerizable organic liquid selected from the group consisting of a polymerizable organic compound and at least two such organic compounds being copolymerizable with each other;
(b) at least one organic compound being copolymerizable with said polymerizable organic liquid (a), said organic compound being soluble in and being contained in solution by said polymerizable organic liquid (a) and being at least partly separated from said solution at the phase boundary by addition thereto of said aqueous medium (1), thereby acting as an emulsifier; and
(c) at least another organic compound being soluble in and contained in solution by said polymerizable organic liquid (a) and not being separated from said solution at the phase boundary by the addition of said aqueous medium (1), said organic liquid (2) forming the continuous phase,
polymerizing said water-in-oil emulsion in the presence of conventional polymerization initiators as well as conventional polymerization activators without breaking the water-in-oil emulsion, and, at least partly, removing the aqueous medium (1) from the resulting porous plastic.

8. The process according to claim 7, wherein the resulting water-in-oil emulsion contains at least 50%, by volume, of water.

9. The process according to claim 7, wherein the resulting water-in-oil emulsion contains more than 66%, by volume, of water.

10. The process according to claim 7, wherein the aqueous medium is an aqueous solution of an inorganic salt.

11. The process according to claim 7, wherein the spherical droplets of water contained in the resulting water-in-oil emulsion have a diameter not exceeding 50μ.

12. The process according to claim 7, wherein the polymerizable organic liquid (a) is a compound selected from the group consisting of styrene, an acrylic acid ester, a methacrylic acid ester, and a mixture thereof.

13. The process according to claim 7, wherein the organic compound (b) is an unsaturated polyester, the free carboxyl groups of which are at least partly neutralized by a compound of basic reaction.

14. The process according to claim 7, wherein fillers, fibrous materials, and reinforcing agents are added to the water-in-oil emulsion.

15. The process according to claim 7, wherein between about 0.01% and about 15%, calculated for the polymerizable organic liquid (a), of the water-soluble preliminary condensation product of melamine and formaldehyde are added to the water-in-oil emulsion containing a polymerizable vinyl compound as polymerizable organic liquid (a) and an unsaturated polyester obtained from an unsaturated dicarboxylic acid and a polyhydric alcohol as emulsifying agent (b), said unsaturated polyester being soluble in and dissolved by said polymerizable vinyl compound.

16. The process according to claim 7, wherein between about 0.05% and about 2.5%, calculated for the polymerizable portion of the water-in-oil emulsion of the emulsifying agent (b) consisting of a polymerization product of high molecular weight being soluble in the water-insoluble polymerizable ethylenically unsaturated organic liquid (a), and at least 50% of said polymerizable organic liquid (a) are present in said water-in-oil emulsion.

17. The process according to claim 16, wherein between about 0.3% and about 1.2%, calculated for the polymerizable portion of the water-in-oil emulsion of the emulsifying agent (b) consisting of a polymerization product of high molecular weight being soluble in the water-insoluble polymerizable ethylenically unsaturated organic liquid (a), and at least 50% of said polymerizable organic liquid (a) are present in said water-in-oil emulsion.

18. The porous plastic produced by the process of claim 7.

19. A method of producing porous plastic shaped products, which method comprises forming a stable water-in-oil emulsion composed of water, methylmethacrylate as the oil phase, and polystyrene having a molecular weight of at least 10,000 as the emulsifier, shaping the emulsion to the desired product, polymerizing the methylmethacrylate to form polymethylmethacrylate without breaking the dispersed nature of the emulsion, thereby forming the solid shaped polymethylmethacrylate product having a plurality of water droplets dispersed therein, and at least partly removing the water from the resulting product.

20. A method of producing porous plastic shaped products which method comprises forming a stable water-in-oil emulsion composed of water, styrene as the oil phase, and polystyrene as the emulsifier, shaping the emulsion to the desired product, polymerizing the styrene to form polystyrene without breaking the dispersed nature of the emulsion, thereby forming the solid shaped plastic product having a plurality of water droplets dispersed therein, and at least partly removing the water from the resulting product.

21. A method of producing porous plastic shaped products, which method comprises forming a stable water-in-oil emulsion composed of water, a mixture of styrene and acrylonitrile as the oil phase, and polystyrene as the emulsifier, shaping the emulsion to the desired product, polymerizing the mixture of styrene and acrylonitrile to form a copolymerization product therefrom without breaking the dispersed nature of the emulsion, thereby forming the solid shaped plastic product having a plurality of water droplets dispersed therein, and at least partly removing the water from the resulting product.

22. A method of producing porous plastic shaped products, which method comprises forming a stable water-in-oil emulsion composed of water, styrene as the oil phase, and an unsaturated polyester obtained from maleic acid, phthalic acid, and propylene glycol as the emulsifier, shaping the smulsion to the desired product, polymerizing the styrene to form polystyrene without breaking the dispersed nature of the emulsion, thereby forming the solid shaped plastic product having a plurality of water droplets dispersed therein, and at least partly removing the water from the resulting product.

23. A method of producing porous plastic shaped products, which method comprises forming a stable water-in-oil emulsion composed of water, styrene as the oil phase, an unsaturated polyester obtained from maleic acid, phthalic acid, and propylene glycol as the emulsifier, and polyvinylchloride powder, shaping the emulsion to the desired product, polymerizing the styrene to form polystyrene without breaking the dispersed nature of the emulsion, thereby forming the solid shaped plastic product having a plurality of water droplets dispersed therein, and at least partly removing the water from the resulting product.

24. A method of producing porous plastic shaped products, which method comprises forming a stable water-in-oil emulsion composed of
 (1) an aqueous medium forming the aqueous dispersed phase and
 (2) as dispersion medium, an organic liquid containing
  (a) a polymerizable organic liquid forming the oil phase and
  (b) an emulsifying agent,
shaping the emulsion to the desired product, polymerizing the polymerizable organic liquid in said water-in-oil emulsion to form the respective polymerization product without breaking the dispersed nature of the emulsion, thereby forming the solid shaped plastic product having a plurality of water droplets dispersed therein, and at least partly removing the water from the resulting product.

25. A method of producing porous plastic shaped products, which method comprises forming a stable water-in-oil emulsion composed of
 (1) an aqueous medium forming the aqueous dispersed phase and
 (2) as dispersion medium, an organic liquid containing
  (a) a polymerizable organic liquid forming the oil phase and
  (b) an emulsifying agent,
the water content of said water-in-oil emulsion being between about 25% and about 95%, shaping the emulsion to the desired product, polymerizing the polymerizable organic liquid in said water-in-oil emulsion to form the respective polymerization product without breaking the dispersed nature of the emulsion, thereby forming the solid shaped plastic product having a plurality of water droplets dispersed therein, and at least partly removing the water from the resulting product.

26. The porous plastic shaped product produced by the process of claim 24.

References Cited by the Examiner

UNITED STATES PATENTS

| 2,700,026 | 1/1955 | Dibert | 260—29.6 |
| 2,872,423 | 2/1959 | Goldstein | 260—29.6 |

FOREIGN PATENTS 763,396  12/1956  Great Britain.

MURRAY TILLMAN, *Primary Examiner.*

JOHN C. BLEUTGE, *Assistant Examiner.*